Figure 1:
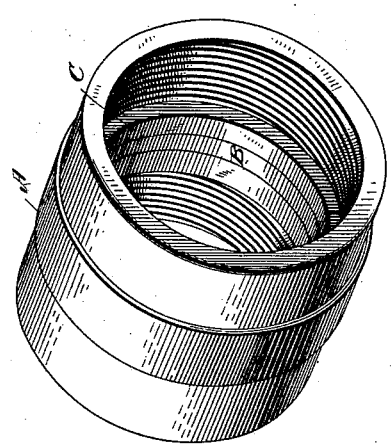

(No Model.)

J. L. DUFF.
PIPE COUPLING.

No. 349,146. Patented Sept. 14, 1886.

Witnesses
Wm L. Speiden
Alfred T. Gage

Inventor
John L. Duff
By his Attorney
Franklin H. Hough

UNITED STATES PATENT OFFICE.

JOHN L. DUFF, OF SAGO, OHIO.

PIPE-COUPLING.

SPECIFICATION forming part of Letters Patent No. 349,146, dated September 14, 1886.

Application filed February 18, 1886. Serial No. 192,342. (No model.)

*To all whom it may concern:*

Be it known that I, JOHN L. DUFF, a citizen of the United States, residing at Sago, in the county of Muskingum and State of Ohio, have invented certain new and useful Improvements in Pipe-Couplings; and I do hereby declare the following to be a full, clear, and exact description of the invention, such as will enable others skilled in the art to which it appertains to make and use the same, reference being had to the accompanying drawings and letters of reference marked thereon, which form a part of this specification.

Like letters refer to similar parts throughout the several views.

My invention relates to pipe couplings, and has for its object to provide a simple and effective coupling or joint for gas and other pipes, all as more fully hereinafter described, shown in the drawings, and specifically pointed out in the claim.

Figure 2:
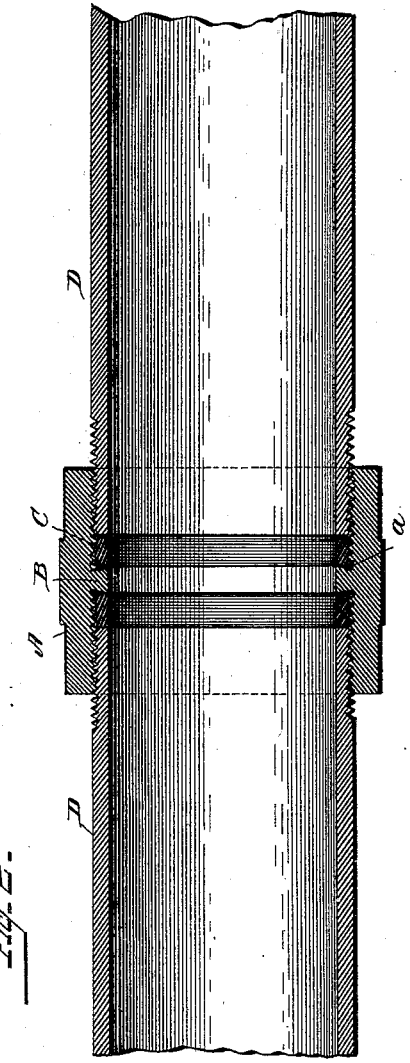

Referring to the drawings, Figure 1 is a perspective view of the coupling detached from the pipes, showing the soft-metal rings in place therein; and Fig. 2 is a longitudinal section of two pipes joined by means of my improved coupling device.

A represents the coupling device, which consists of a heavy band of metal which is provided with an interior annular flange or collar, B, having its sides beveled, as shown at $a$. This band A is interiorly threaded from the opposite sides of the collar B outwardly. Externally-threaded rings, of lead or other soft metal, having their inner edges beveled to fit or engage the beveled sides of the collars B, are secured upon either side of the said collar, as shown. These rings are designated by the letter C.

As a matter of convenience in using the coupling, I have formed the threaded interior in such a way that one of the ends of the band will accommodate a right and the opposite end a left hand screw. The ends of the pipes D D are exteriorly threaded to engage with the interiorly-threaded band or coupling.

I have shown the interiorly-threaded flange or collar B as formed integral with and forming a part of the coupling A, as I have found it preferable to construct it in this manner. I do not wish, however, to confine myself to this construction, as it is at once evident that if for any reason it should be considered desirable, the collar may be made separately and secured thereto in any well-known way. Furthermore, I do not wish to confine myself to the use of the soft-metal rings C, as they may be dispensed with and other suitable substances—such as, for instance, red lead—used in their stead. I prefer, however, to use soft-metal rings screw-threaded, as described.

From the foregoing description the operation of my device will be clearly understood. The soft-metal rings C are first securely screwed into their places upon either side of the flange or collar B, the beveled edge of the rings engaging the beveled sides of the collar. The threaded ends of the pipes to be coupled are then introduced and screwed firmly down upon the soft-metal rings, thus forming an absolutely secure joint which will be at once both air and gas tight.

I am aware that pipe-couplings have been formed with an internal annular collar, and that soft-metal gaskets provided with a beveled edge have heretofore been used in connection with a coupling thus formed. I therefore do not claim such, broadly.

On reference to Fig. 2, it will be observed that by beveling the opposite sides of the collar B, I give to such collar in cross section the form of a dovetail, and to this I attach importance. I also attach importance to the fact that the coupling is internally threaded from the opposite sides of said collar outwardly, and that the rings C be externally threaded to engage the internal threads of the collar, and that they have their inner ends beveled to correspond inversely with the bevel of the collar. By this construction I secure a much tighter joint, increase the contact-surface of the collar and gaskets, and insure the perfect parallelism of the rings and coupling in inserting the former into the latter, and also guard against the danger of loss or displacement of the rings during transportation, which is liable to occur where the rings are simply inserted in the coupling as heretofore.

Having thus described my invention and set forth its merits, what I claim to be new, and desire to secure by Letters Patent, is—

The combination, with the coupling A, havformed integral therewith the interior annular flange or collar, B, having its sides beveled inwardly to form a dovetail, as shown, and interiorly threaded from the opposite sides of said collar outwardly, the threads upon opposite sides of said collar being right and left, of the soft-metal rings C, externally threaded to engage the internal thread of said coupling, and each provided with a beveled side to fit the beveled sides of said collar, substantially as and for the purpose specified.

In testimony whereof I affix my signature in presence of two witnesses.

JOHN L. DUFF.

Witnesses:
C. W. SPEER,
C. B. MARSHALL.